(12) United States Patent
Park et al.

(10) Patent No.: US 9,996,118 B1
(45) Date of Patent: Jun. 12, 2018

(54) MOBILE TERMINAL AND METHOD FOR CONTROLLING THE SAME

(71) Applicant: LG ELECTRONICS INC., Seoul (KR)

(72) Inventors: Mihyun Park, Seoul (KR); Hongjo Shim, Seoul (KR); Hyunok Lee, Seoul (KR); Mansoo Sin, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days. days.

(21) Appl. No.: 15/639,130

(22) Filed: Jun. 30, 2017

(30) Foreign Application Priority Data

Dec. 13, 2016 (KR) ........................ 10-2016-0169767

(51) Int. Cl.
G08B 21/00 (2006.01)
G06F 1/16 (2006.01)
H04N 1/00 (2006.01)
H04W 4/00 (2018.01)

(52) U.S. Cl.
CPC ....... G06F 1/1694 (2013.01); H04N 1/00307 (2013.01); H04W 4/008 (2013.01)

(58) Field of Classification Search
CPC .... G06F 1/1694; B60R 25/2036; G08B 31/00
USPC ........................... 340/686.1, 540, 541, 691.6
See application file for complete search history.

(56) References Cited

U.S. PATENT DOCUMENTS

| 7,333,604 B2* | 2/2008 | Zernovizky | H04M 19/044 379/388.03 |
| 8,830,176 B2* | 9/2014 | Bos | G06F 3/0237 345/157 |
| 2010/0010774 A1 | 1/2010 | Ma et al. | |
| 2013/0262352 A1 | 10/2013 | Sung et al. | |

FOREIGN PATENT DOCUMENTS

| EP | 2264988 A1 | 12/2010 |
| KR | 10-2010-0008071 A | 1/2010 |
| KR | 10-2016-0115546 A | 10/2016 |

* cited by examiner

*Primary Examiner* — Tai T Nguyen
(74) *Attorney, Agent, or Firm* — Birch, Stewart, Kolasch & Birch, LLP

(57) ABSTRACT

A mobile terminal including a wireless communication unit configured to provide wireless communication; a display on the terminal body, an acceleration sensor; a low-energy image sensor; and a controller configured to control the acceleration sensor to sense an acceleration of the mobile terminal, control the low-energy sensor to capture a surrounding image of the mobile terminal, in response to the sensed acceleration of the mobile terminal being related to a body movement of a user carrying the mobile terminal based on the surrounding image, output information related to the body movement of the user of the mobile terminal based on the sensed acceleration, and in response to the sensed movement of the mobile terminal being related to a movement different than the body movement of the user based on the surrounding image, disregard the sensed acceleration.

18 Claims, 20 Drawing Sheets

(a)

(b)

(a)　　　　　　　　　(b)

(a)

(b)

(c)

(a)

(b)

(a)                (b)

(a)     (b)

(a)

(b)

MOBILE TERMINAL AND METHOD FOR CONTROLLING THE SAME

CROSS-REFERENCE TO RELATED APPLICATION

Pursuant to 35 U.S.C. § 119(a), this application claims the benefit of earlier filing date and right of priority to Korean Application No. 10-2016-0169767, filed on Dec. 13, 2016, the contents of which is incorporated by reference herein in its entirety.

BACKGROUND OF THE INVENTION

Field of the Invention

The present disclosure relates to a mobile terminal in which malfunction of an acceleration sensor is prevented, and a control method thereof.

Background of the Invention

Terminals may be generally classified as mobile/portable terminals or stationary terminals. Mobile terminals may also be classified as handheld terminals or vehicle mounted terminals.

Mobile terminals have become increasingly more functional. Examples of such functions include data and voice communications, capturing images and video via a camera, recording audio, playing music files via a speaker system, and displaying images and video on a display. More recently, mobile terminals have been configured to receive broadcast and multicast signals which permit viewing of content such as videos and television programs.

As functions of the terminal become more diversified, the terminal can support more complicated functions such as capturing images or video, reproducing music or video files, playing games, receiving broadcast signals, and the like. By comprehensively and collectively implementing such functions, the mobile terminal may be embodied in the form of a multimedia player or a device. Efforts are ongoing to support and increase the functionality of mobile terminals. Such efforts include software and hardware improvements, as well as changes and improvements in the structural components.

Recently, various sensors are installed in a mobile terminal and various functions related to a user's physical condition re provided by utilizing various sensors. For example, a mobile terminal may provide a function of detecting the number of steps of a user by utilizing an acceleration sensor.

Also, when a user is placed within a vehicle (or a carrier) or an airplane, such an acceleration sensor senses acceleration based on the vehicle or the airplane although the user does not substantially move. That is, malfunction may occur as a mobile terminal determines an acceleration in accordance with a movement of the vehicle or the airplane as an acceleration in accordance with a movement of the user.

SUMMARY OF THE INVENTION

Therefore, an aspect of the detailed description is to prevent malfunction of an acceleration sensor when a user is placed in a vehicle.

Another aspect of the detailed description is to prevent malfunction when a screen is switched using an acceleration sensor.

Another aspect of the detailed description is to enhance accuracy of detection regarding a knock-on input using an acceleration sensor.

To achieve these and other advantages and in accordance with the purpose of this specification, as embodied and broadly described herein, a mobile terminal includes: a terminal body; an acceleration sensor sensing an acceleration of the terminal body; a low-energy image sensor capturing a surrounding image of the terminal body; and a controller determining, when an acceleration is sensed by the acceleration sensor, a movement of the terminal body based on a surrounding image captured at the time of sensing the acceleration, and the acceleration.

To achieve these and other advantages and in accordance with the purpose of this specification, as embodied and broadly described herein, a method for controlling a mobile terminal includes: sensing an acceleration of a terminal body; capturing a surrounding image of the terminal body at the time when the terminal body is sensed, through a low-energy image sensor; determining whether the acceleration is an acceleration related to a movement of the terminal body based on the surrounding image of the terminal body; and determining a movement of the terminal body in accordance with the acceleration in different manners based on a determination result, wherein, in the determining of a movement of the terminal body in accordance with the acceleration, when the acceleration is an acceleration related to a movement of the terminal body, a movement of the terminal body is determined according to the acceleration, and when the acceleration is not an acceleration related to a movement of the terminal body, a movement of the terminal body is not determined according to the acceleration.

Further scope of applicability of the present application will become more apparent from the detailed description given hereinafter. However, it should be understood that the detailed description and specific examples, while indicating preferred embodiments of the invention, are given by way of illustration only, since various changes and modifications within the scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

In the drawings.

DETAILED DESCRIPTION OF THE INVENTION

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1A:
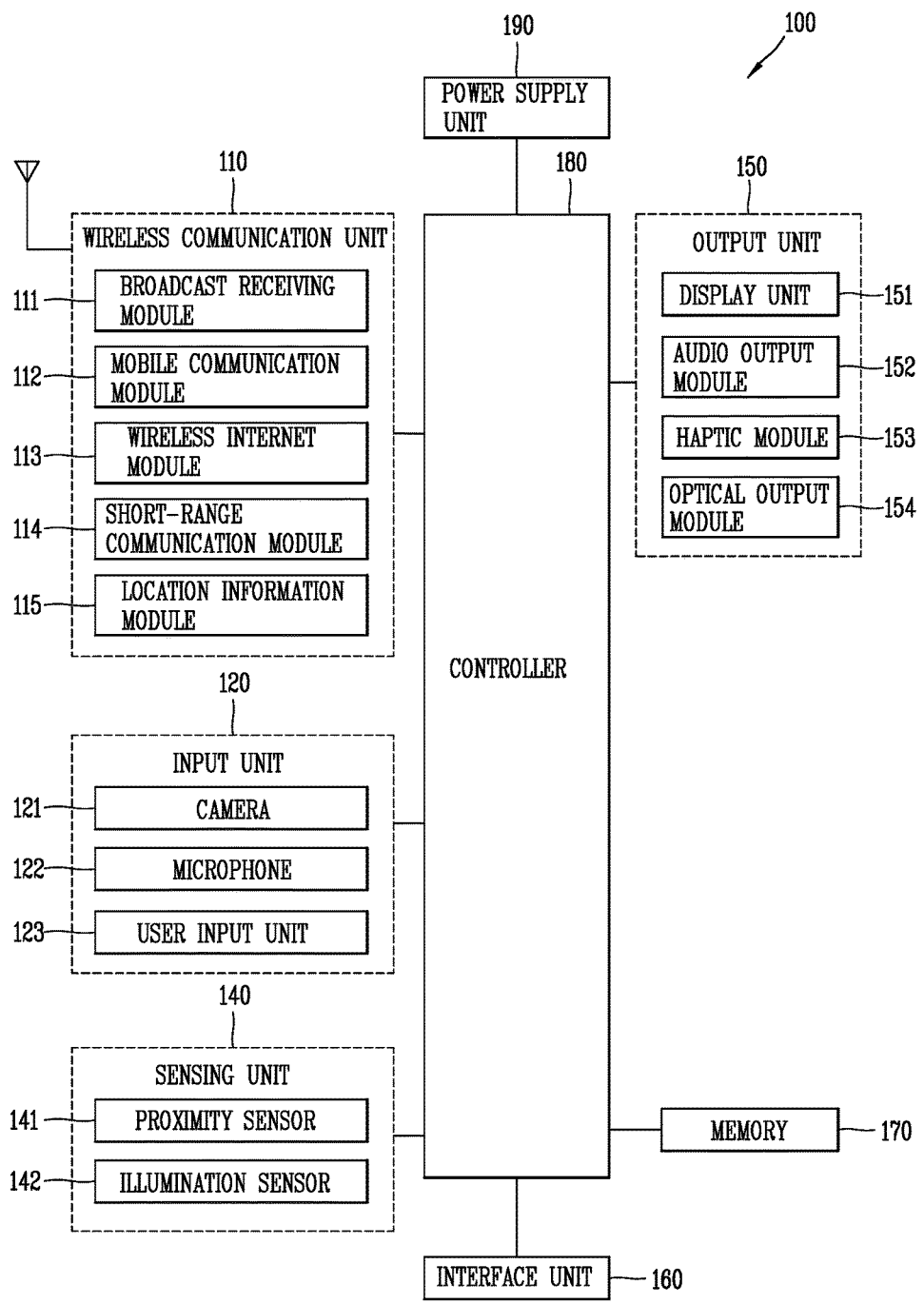
FIG. 1A is a block diagram of a mobile terminal according to an embodiment of the present disclosure.
Figure 1B:
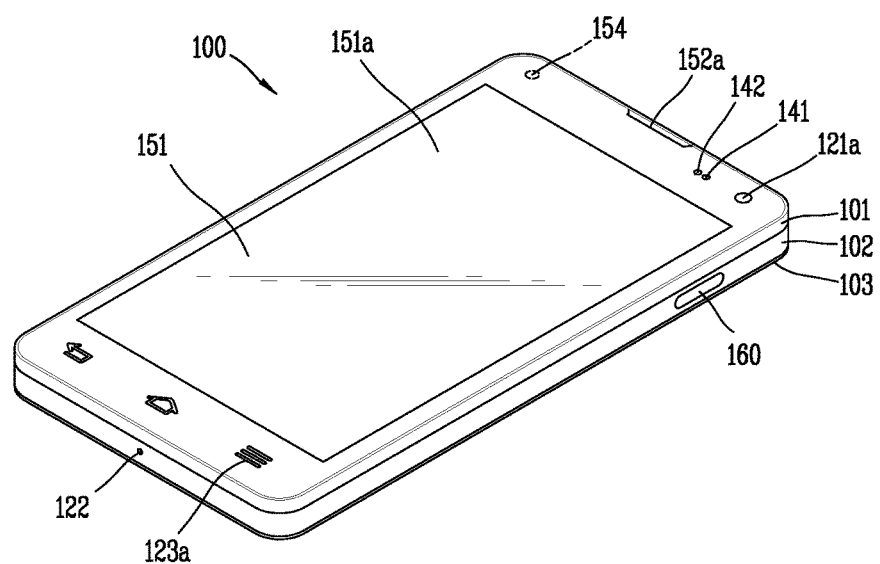
FIGS. 1B and 1C are conceptual views of an example of the mobile terminal, viewed from different directions.
Figure 1C:
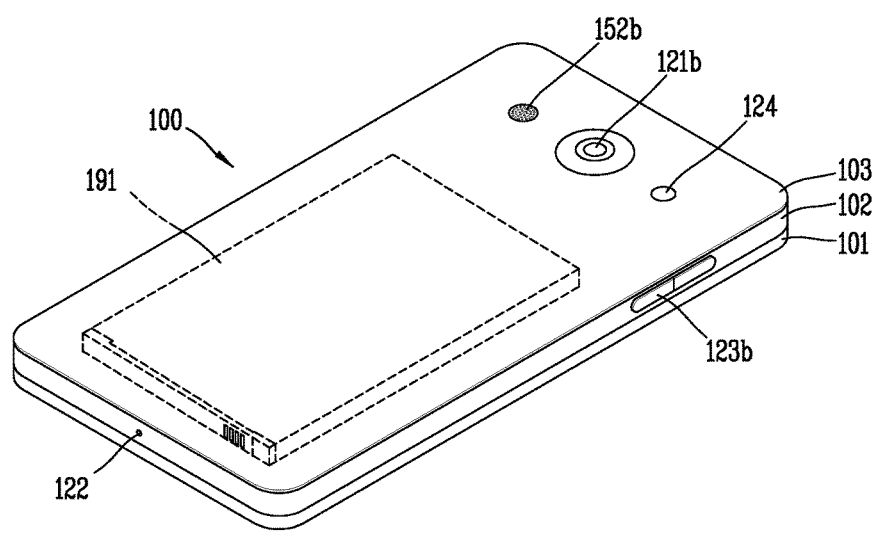

Reference is now made to FIGS. 1A-1C, where FIG. 1A is a block diagram of a mobile terminal in accordance with the present disclosure, and FIGS. 1B and 1C are conceptual views of one example of the mobile terminal, viewed from different directions.

The mobile terminal 100 is shown having components such as a wireless communication unit 110, an input unit 120, a sensing unit 140, an output unit 150, an interface unit 160, a memory 170, a control unit 180, and a power supply unit 190. Implementing all of the illustrated components is not a requirement, and that greater or fewer components may alternatively be implemented.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks. To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by control unit 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1A, the sensing unit 140 is shown having a proximity sensor 141 and an illumination sensor 142. If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154.

The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the control unit 180 to perform an operation (or function) for the mobile terminal 100.

The control unit 180 typically functions to control overall operation of the mobile terminal 100, in addition to the operations associated with the application programs. The control unit 180 may provide or process information or functions appropriate for a user by processing signals, data, information and the like, which are input or output by the various components depicted in FIG. 1A, or activating application programs stored in the memory 170. As one example, the control unit 180 controls some or all of the components illustrated in FIGS. 1A-1C according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

At least some of the above components may operate in a cooperating manner, so as to implement an operation or a control method of a glass type terminal according to various embodiments to be explained later. The operation or the control method of the glass type terminal may be implemented on the glass type terminal by driving at least one application program stored in the memory 170.

Referring still to FIG. 1A, various components depicted in this figure will now be described in more detail. Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like).

Examples of wireless signals transmitted and/or received via the mobile communication module 112 include audio call signals, video (telephony) call signals, or various formats of data to support communication of text and multimedia messages. The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which can exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the control unit 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user can answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal.

As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the control unit 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. Further, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The control unit 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this instance, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like). In general, control unit 180 processes data corresponding to proximity touches and proximity touch patterns sensed by the proximity sensor 141, and cause output of visual information on the touch screen. In addition, the control unit 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others.

As one example, the touch sensor can be configured to convert changes of pressure applied to a specific part of the display unit 151, or convert capacitance occurring at a specific part of the display unit 151, into electric input signals. The touch sensor can also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the control unit 180. Accordingly, the control unit 180 may sense which region of the display unit 151 has been touched. Here, the touch controller may be a component separate from the control unit 180, the control unit 180, and combinations thereof.

In some embodiments, the control unit 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor can be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor can be implemented to recognize position information relating to a touch object using ultrasonic waves. The control unit 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor. Implementing the camera 121 with a laser sensor can allow detection of a touch of a physical object with respect to a 3D stereoscopic image. The photo sensor can be laminated on, or overlapped with, the display device. The photo sensor can be configured to scan movement of the physical object in proximity to the touch screen. In more detail, the photo sensor can include photo diodes and transistors at rows and columns to scan content received at the photo sensor using an electrical signal which changes according to the quantity of applied light. Namely, the photo sensor can calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images. A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the control unit. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented so the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the control unit 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc.), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The control unit 180 may typically control the general operations of the mobile terminal 100. For example, the control unit 180 may set or release a lock state for restricting a user from inputting a control command with respect to applications when a status of the mobile terminal meets a preset condition.

The control unit 180 can also perform the controlling and processing associated with voice calls, data communications, video calls, and the like, or perform pattern recognition processing to recognize a handwriting input or a picture drawing input performed on the touch screen as characters or images, respectively. In addition, the control unit 180 can control one or a combination of those components in order to implement various exemplary embodiments disclosed herein.

The power supply unit 190 receives external power or provide internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance. Various embodiments described herein may be implemented in a computer-readable medium, a machine-readable medium, or similar medium using, for example, software, hardware, or any combination thereof.

Referring now to FIGS. 1B and 1C, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like. As an alternative to the example in which the plurality of cases form an inner space for accommodating components, the mobile terminal 100 may be configured such that one case forms the inner space. In this example, a mobile terminal 100 having a uni-body is formed so synthetic resin or metal extends from a side surface to a rear surface.

If desired, the mobile terminal 100 may include a waterproofing unit for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

The mobile terminal 100 can include the display unit 151, the first and second audio output unit 152a/152b, the proximity sensor 141, the illumination sensor 142, the optical output unit 154, the first and second camera 121a/121b, the first and second operation unit 123a/123b, the microphone 122, the interface unit 160 and the like.

FIGS. 1B and 1C depict certain components as arranged on the mobile terminal. However, alternative arrangements are possible and within the teachings of the instant disclosure. Some components may be omitted or rearranged. For example, the first manipulation unit 123a may be located on another surface of the terminal body, and the second audio output module 152b may be located on the side surface of the terminal body.

The display unit 151 outputs information processed in the mobile terminal 100. The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123a. The first audio output module 152a may be implemented in the form of a speaker to output voice audio, alarm sounds, multimedia audio reproduction, and the like.

The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this instance, a hole independently formed to output audio sounds may not be seen or is otherwise hidden in Willis of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller can control the optical output unit 154 to stop the light output.

The first camera 121a can process image frames such as still or moving images obtained by the image sensor in a capture mode or a video call mode. The processed image frames can then be displayed on the display unit 151 or stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may also employ any non-tactile method that allows the user to perform manipulation such as proximity touch, hovering, or the like.

FIG. 1B illustrates the first manipulation unit 123a as a touch key, but possible alternatives include a mechanical key, a push key, a touch key, and combinations thereof. Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123a in the rear input unit. As such, in situations where the first manipulation unit 123a is omitted from the front side, the display unit 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a. If desired, second camera 121a may alternatively be located at other locations, or made to be moveable, in order to have a different image capturing direction from that which is shown.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

As shown in FIG. 1C, a flash 124 is shown adjacent to the second camera 121*b*. When an image of a subject is captured with the camera 121*b*, the flash 124 may illuminate the subject. As shown in FIG. 1C, the second audio output module 152*b* can be located on the terminal body. The second audio output module 152*b* may implement stereophonic sound functions in conjunction with the first audio output module 152*a*, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body. The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

Hereinafter, exemplary embodiments related to a control method that may be implemented in the mobile terminal configured as described above will be described with reference to the accompanying drawings. It will be apparent to those skilled in the art that modifications and variations can be made without departing from the spirit and scope of the invention.

The mobile terminal according to the present disclosure includes a low-energy image sensor capturing an image of a nearby object with low power to sense the object. Hereinafter, the low-energy image sensor will be described with reference to FIGS. 2A and 2B, which are conceptual views of components of a low-energy image sensor.

The mobile terminal according to the present disclosure may include a low-energy image sensor 200, which detects an object positioned within a predetermined area based on a black-and-white image. The low-energy image sensor 200 can also be termed a glance sensor. Hereinafter, the term of low-energy image sensor 200 will be used for the purposes of description, but such a term may also be changed by other names by a person skilled in the art.

The low-energy image sensor 200 is constantly in an activated state as long as power is supplied to the mobile terminal. Here, the activated state refers to a state in which an object positioned within a predetermined area can be detected based on a black-and-white image sensor of the low-energy image sensor 200. Thus, in the present disclosure, an object adjacent to the mobile terminal can be sensed with low power.

Figure 2A:
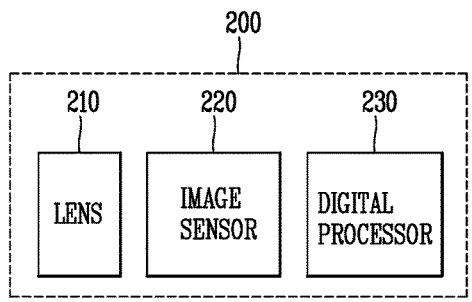
FIGS. 2A and 2B are conceptual views of components of a low-energy image sensor.

Referring to FIG. 2A, the low-energy image sensor 200 includes a lens 210, an image sensor 220, and a digital processor 230. The lens 210 can have a range of a field of view (FOV) that is generally larger than a range of a field of view of a front camera lens provided in the mobile terminal. For example, a range of an FOV of the lens 210 of the low-energy image sensor 200 can be 120 degrees, and a range of an FOV of the front camera lens may be 82 degrees. Thus, the low-energy image sensor 200 can capture an image of an object in a wider range. The low-energy image sensor 200 can also sense an object present in a position which cannot be imaged by the front camera.

In addition, the image sensor 220 can capture a black-and-white image. For example, the image sensor 220 can capture a black-and-white image of a QVGA class (resolution: 320×240). Thus, the image sensor 220 can be driven with power significantly less than that of the front camera using a color sensor.

Further, the digital processor 230 can detect a contour and/or shape of a subject included in the black-and-white image sensed by the image sensor 220 and perform face detection, eye detection, gesture detection, gaze detection, and the like, based on the detected contour and/or shape of the subject. In more detail, face detection is a process of detecting whether the subject captured as the black-and-white image is a face image. Similarly, eye detection is a process of detecting whether the subject captured as the black-and-white image is an eye image, and gesture detection is a process of detecting a gesture of the subject captured as the black-and-white image. Also, gaze detection is a process of detecting a direction of a gaze based on the black-and-white image.

For example, the digital processor 230 can analyze the black-and-white image received from the image sensor 220 based on a preset algorithm, and determine whether the subject captured as the black-and-white image is a user's face or a user's finger based on the analysis result. Here, the preset algorithm may be an image analysis algorithm, and a known image analysis algorithm may be used. In this disclosure, details related to the image analysis algorithm are obvious to a person skilled in the art, and thus, a description thereof is omitted.

Because the digital processor 230 receives the low-resolution black-and-white image from the image sensor 220, the digital processor 230 can determine a contour or shape of an object, but cannot determine a function requiring high resolution image such as face recognition.

Further, the digital processor 230 can generally control an operation of the low-energy image sensor 200 through communication with a main processor (i.e., the controller 180 of FIG. 1) of the mobile terminal. In more detail, the processor 230 can receive a control command or a control signal from the main processor and control an operation of the low-energy image sensor 200 using the lens 210 and the image sensor 220 based on the received control command or control signal. Also, the digital processor 230 can transfer a result of controlling of the operation of the low-energy image sensor 200 to the main processor. For example, the digital processor 230 can transfer information of a result of performing face detection, eye detection, gesture detection, and the like, to the main processor.

The low-energy image sensor can detect a nearby object using low energy, compared with a proximity sensor detecting whether an object is in the proximity using existing light or a magnetic field. Thus, the low-energy image sensor can be utilized for the purpose of replacing an existing proximity sensor.

In addition, the digital processor 230 may further include a low-energy CPU, a memory storing algorithm information, and the like, and hardware blocks. Also, in the low-energy image sensor, besides the components, a component required for driving the low-energy image sensor, such as a power supply unit, or the like, may be added or omitted.

Figure 2B:
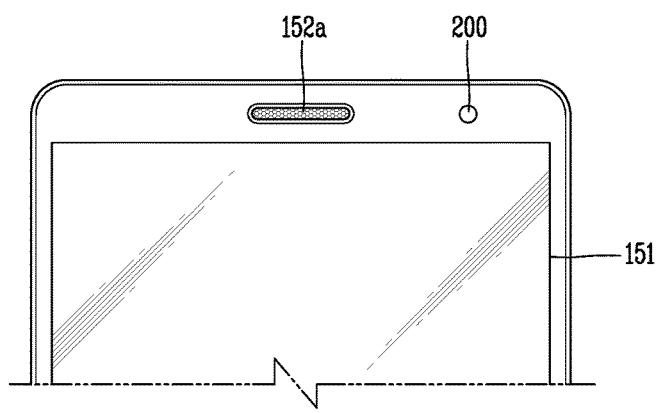

Referring to FIG. 2B, the low-energy image sensor 200 can be installed in a region of the terminal body. For example, as illustrated in FIG. 2B, the low-energy image sensor 200 can be disposed in an upper end portion of a front surface of the terminal body. In more detail, the display unit 151 may be disposed on the front surface of the terminal body. Also, a receiver 152a is disposed in a region adjacent to the display unit 151, and the low-energy image sensor 200 can be disposed in a region adjacent to the receiver 152a. Thus, the low-energy image sensor 200 can sense an object positioned in a region adjacent to the front surface of the terminal body.

In addition, in the present disclosure, one or more low-energy image sensors 200 can be provided, and a plurality of low-energy image sensors 200 can be disposed to be spaced apart from each other. The low-energy image sensors 200 disposed to be spaced apart from each other can sense objects positioned in a region adjacent to regions in which the low-energy image sensors 200 are positioned.

Figure 3:
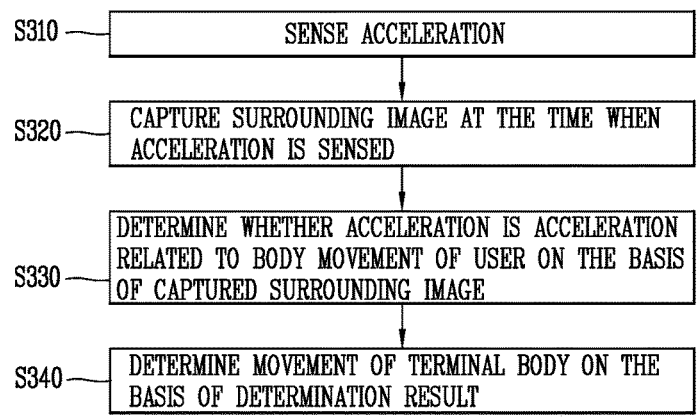
FIG. 3 is a flow chart illustrating a method for determining a movement of a terminal body by utilizing an acceleration sensor and a low-energy image sensor.
Figure 4:
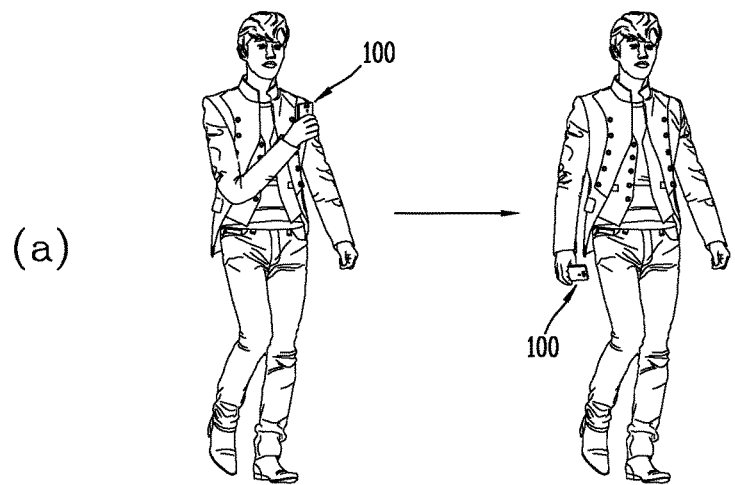
FIGS. 4 to 6B are conceptual views illustrating FIG. 3.
Figure 4:
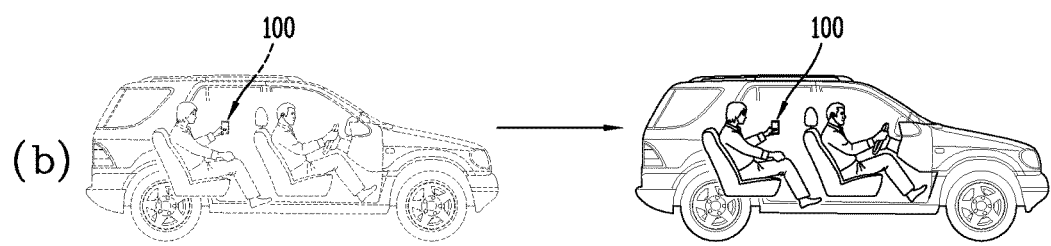

Hereinafter, a method for improving accuracy of an operation related to acceleration sensed by the acceleration sensor by utilizing the low-energy image sensor will be described will be described. In particular, FIG. 3 is a flow chart illustrating a method for determining movement of a terminal body by utilizing an acceleration sensor and a low-energy image sensor, and FIGS. 4 to 6B are conceptual views illustrating FIG. 3.

The mobile terminal including the acceleration sensor, the low-energy image sensor 200, and the controller 180 can also include a health application providing a function related to health of a human body. The health application can be downloaded from an application (app) market or be stored as a basic application in the memory when the mobile terminal is released from a factory.

Further, the health application is used to determine a body movement of a user of the mobile terminal based on an acceleration sensed by the acceleration sensor. The body movement includes, for example, the number of steps, ascending and descending the stairs, a run speed, etc.

The controller 180 can also execute the health application based on a control command input by the user. For example, in response to a touch input applied to an icon of the health application, the controller 180 can execute the health application. Here, the controller 180 can determine a movement of the user's body based on an acceleration sensed by the acceleration sensor.

When the health application is executed, the controller 180 can display an execution screen of the health application on the display unit 151. The execution screen of the health application may include the number of steps, a walk time, a run time, a run distance, calorie consumption, a distance, the number of times of ascending stairs, the number of times of descending stairs, and the like. Thus, the user can thus collect and view information related to the number of steps per day.

Hereinafter, a method for determining the movement of the user's body will be described with reference to the accompanying drawings. In the following description, the health application is assumed to be executed. First, as shown in FIG. 3, the mobile terminal senses the acceleration through the acceleration sensor (S310).

The acceleration sensor can sense the acceleration of the terminal body. As discussed above, the acceleration sensor can be constantly in an activated state, regardless of a state of the mobile terminal. Here, the activation state refers to a state in which acceleration is detected. That is, the acceleration sensor can sense the acceleration of the main body of the mobile terminal 100, regardless of whether the mobile terminal is locked or unlocked. Further, the acceleration sensor can be selectively activated by the user.

The acceleration sensor can sense the acceleration of the main body of the mobile terminal 100 generated due to a body movement of the user who carriers the mobile terminal. For example, as illustrated in (a) of FIG. 4, the acceleration sensor can sense the acceleration of the main body of the mobile terminal 100 generated as the user walks or runs.

Also, the acceleration sensor can sense the acceleration of the main body of the mobile terminal 100 generated by movement of a vehicle in which the user is present, rather than a body movement of the user who carriers the mobile terminal. The vehicle, which carries (or transports) things or humans, includes a vehicle that drives on the land, a flying object that flies in the sky, and a floating object that floats on the sea. For example, as illustrated in (b) of FIG. 4, when the user who uses or owns the mobile terminal gets in a vehicle, the acceleration sensor can sense the acceleration based on movement of the vehicle.

Further, the acceleration sensor cannot determine a subject that generates acceleration, that is, whether acceleration is generated by the body movement of the user or by the movement of a vehicle in which the user gets in. In order to solve this problem, the controller 180 can utilize a low-energy image sensor.

In more detail, the mobile terminal according to the present disclosure can capture a surrounding image at the time when acceleration is sensed, through the low-energy image sensor (S320). Regardless of a state of the mobile terminal, the low-energy image sensor 200 can capture a surrounding image of the mobile terminal. That is, the low-energy image sensor 200 can always capture a surrounding image of the mobile terminal, regardless of whether the mobile terminal is locked or unlocked. For example, the low-energy image sensor 200 can capture a surrounding image within a predetermined distance with respect to a front side of the main body of the mobile terminal 100.

Figure 5A:
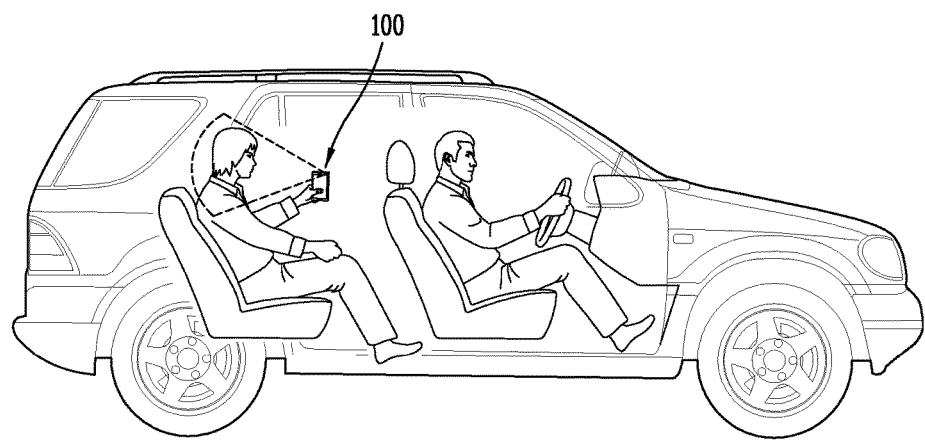

For example, as illustrated in FIG. 5A, when the user gets in a vehicle, the low-energy image sensor 200 can image the inside of the vehicle. Here, as illustrated in (a) and (b) of FIG. 5B, the low-energy image sensor 200 can capture images 510 and 520 including an internal ceiling of the vehicle, seats of the vehicle, and the like. The images 510 and 520 of the inside of the vehicle may be images obtained by imaging the same subject. That is, pixel variations of the two images 510 and 520 may be substantially the same.

Figure 6A:
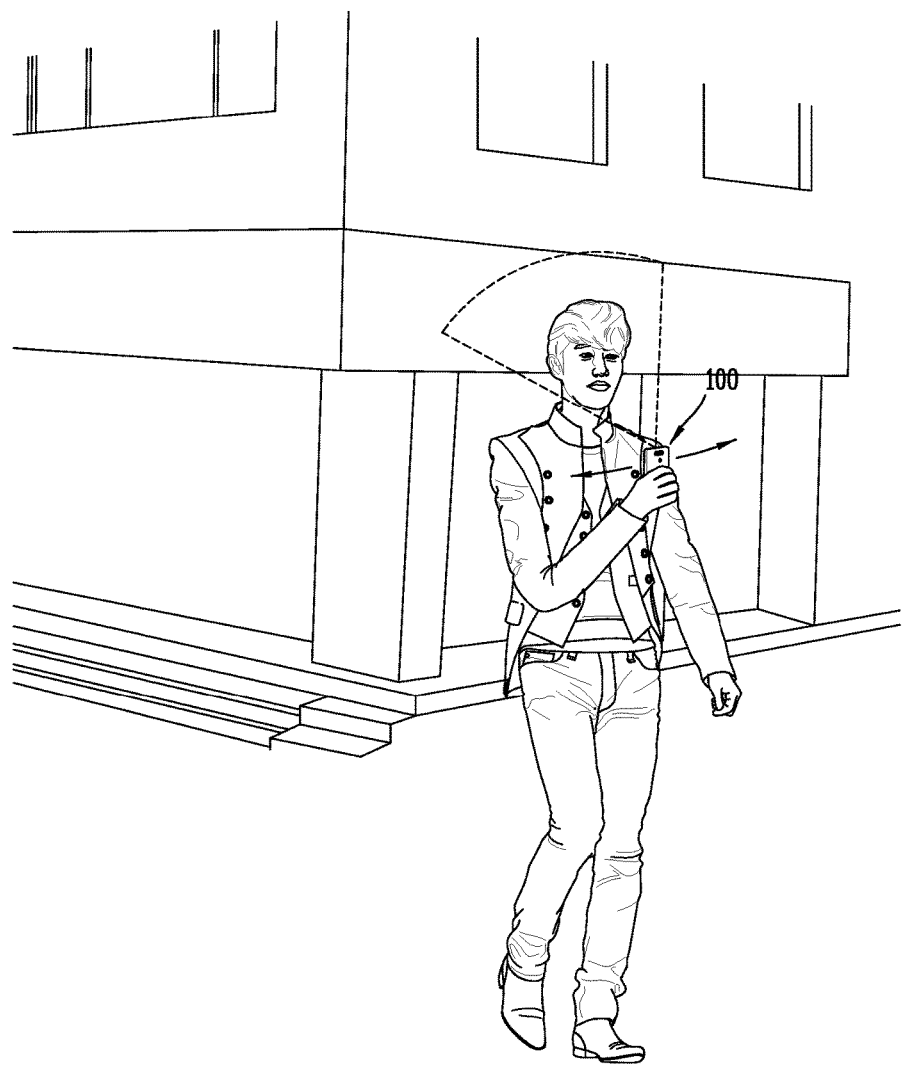
Figure 6B:
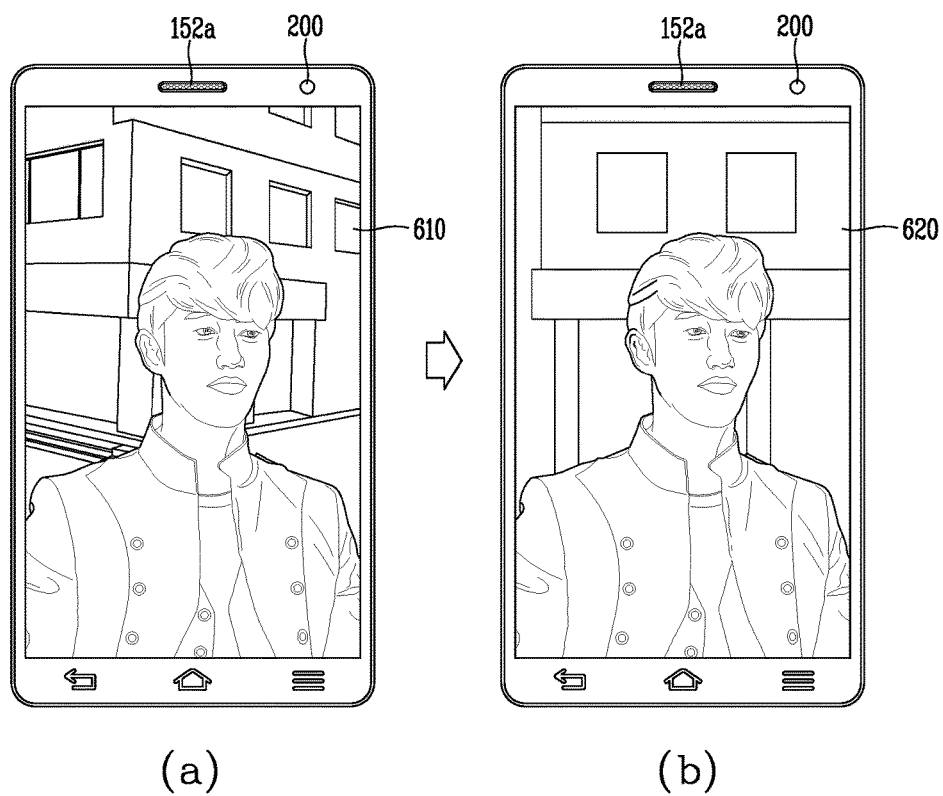

In another example, as illustrated in FIG. 6A, when the user walks, the low-energy image sensor 200 can capture an image of a street on which the user is walking. That is, as illustrated in (a) and (b) of FIG. 6B, the street on which the user is walking can be captured. The image of the street on which the user is walking may have a significant pixel variation in a portion corresponding to the street excluding the user's face. Thus, the controller 180 can sense that the user is currently walking.

In addition, the captured image can be stored in the memory. Here, the controller 180 can automatically delete an image which has been stored for a predetermined period of time, in order to effectively use a storage space of the memory.

Further, the low-energy image sensor 200 can capture an image at the time when acceleration is sensed by the acceleration sensor. In more detail, the low-energy image sensor 200 can capture a surrounding image before acceleration is sensed by the acceleration sensor, a surrounding image at the time when acceleration is sensed by the acceleration sensor, and a surrounding image after acceleration is sensed by the acceleration sensor. Step S310 and step S320 may be interchanged in order or may be performed concurrently.

When acceleration is sensed by the acceleration sensor, the controller 180 can detect the image at the time when the acceleration was sensed from the low-energy image sensor 200 in order to determine whether the acceleration sensed by the acceleration sensor was generated by a body movement of the user. In more detail, the controller 180 can extract the image captured at the time when the acceleration was sensed by the acceleration sensor by comparing an image capture time of the image captured by the low-energy image sensor 200 and a timing at which the acceleration was sensed by the acceleration sensor. For example, with respect to the timing of sensing, the controller 180 can extract a first image captured immediately before the timing of sensing, a second image captured at the same timing as that of the timing of sensing, and a third image captured after the timing of sensing.

The controller 180 of the mobile terminal according to the present disclosure can determine whether the acceleration is an acceleration related to a body movement of the user based on the captured surrounding image (S330). The controller 180 can extract one or more surrounding images, and analyze the one or more extracted surrounding images based on an image analysis algorithm in order to generate situation information representing a surrounding situation.

The situation information, information related to a surrounding environment of the mobile terminal, may include occupancy information indicating whether the user has got in a vehicle, type information of the vehicle, object information related to an object present in the vicinity of the terminal body, action information related to an action of the user, and the like.

Further, the controller 180 can generate situation information based on a learning algorithm such as machine learning. As the learning algorithm, a scheme well known to a person skilled in the art can be used and a detailed description thereof is omitted. Also, in the present disclosure, situation information can be generated through various other algorithms.

Figure 5B:
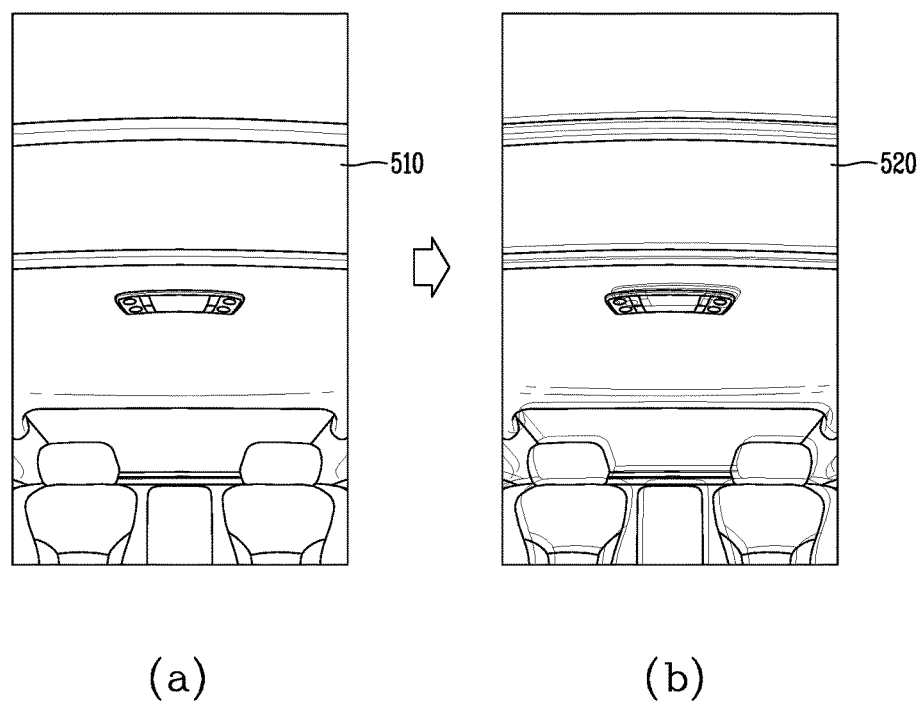

For example, as illustrated in (a) and (b) of FIG. 5B, when it is determined that one or more surrounding images 510 and 520 are images of the inside of the vehicle, the controller 180 can generate occupancy information indicating that the user is placed within the vehicle. In another example, as illustrated in (a) and (b) of FIG. 6B, when the one or more surrounding images are the images 610 and 620 representing a situation in which the user is walking with the terminal held in his hand, the controller 180 can generate action information indicating an action of walking with the terminal held in his hand.

The controller 180 can determine whether the acceleration sensed by the acceleration sensor is acceleration related to a body movement of the user, based on the situation information. Here, acceleration related to a body movement refers to acceleration generated by a body movement of the user.

For example, based on occupancy information indicating that the user is placed within the vehicle, the controller 180 can determine that the acceleration sensed by the acceleration sensor is not acceleration related to a body movement of the user. That is, when the user who holds the mobile terminal is positioned within the vehicle, the controller 180 can determine that the acceleration sensed by the acceleration sensor is acceleration based on a movement of the vehicle. Conversely, based on occupancy information indicating that the user is not placed within the vehicle, the controller 180 can determine that the acceleration sensed by the acceleration sensor is acceleration related to a body movement of the user.

In another example, based on action information indicating that the user is walking with the terminal held in his hand, the controller 180 can determine that the acceleration sensed by the acceleration sensor is acceleration related to a body movement of the user. Conversely, based on action information indicating that the user is not walking, the controller 180 can determine that the acceleration sensed by the acceleration sensor is acceleration not related to a body movement of the user.

Also, the controller 180 can determine a movement of the terminal body based on a determination result (S340). When it is determined that acceleration sensed by the acceleration sensor is acceleration related to a body movement of the user, the controller 180 can determine a movement of the terminal body based on the acceleration sensed by the acceleration sensor. Also, the controller 180 can determine a body movement of the user based on the movement of the terminal body. As the method for determining a movement of the user's body based on the movement of the terminal body, a known scheme can be used, and since such a scheme is obvious to a person skilled in the art, a detailed description thereof is omitted.

For example, when situation information indicating that the user is walking with the terminal held in his hand is generated through the low-energy image sensor, the controller 180 can determine a movement of the terminal body based on acceleration sensed by the acceleration sensor. Also, the controller 180 can determine the number of steps of the user based on the movement of the terminal body.

That is, although a very small acceleration is sensed by the acceleration sensor since the user holds the terminal in his hand, when the acceleration is based on a body movement of the user, a movement of the body can be determined based on acceleration. Thus, in the present disclosure, a problem that the number of steps of the user is not determined because acceleration sensed by the acceleration sensor is very small in a situation in which the user is walking with the terminal held in his hand can be solved. Thus, the accuracy of determining a body movement of the user can be enhanced, compared with when a body movement is determined using only the acceleration sensor.

Conversely, when it is determined that acceleration sensor sensed by the acceleration sensor is not acceleration related to a body movement of the user, the controller 180 can not determine a movement of the terminal body based on acceleration sensed by the acceleration sensor. That is, the controller 180 can disregard the acceleration sensed by the acceleration sensor.

For example, when situation information indicating that the user is present within the vehicle is generated by the low-energy image sensor, the controller 180 can determine that acceleration sensed by the acceleration sensor is not related to a body movement of the user. When it is determined that acceleration sensed by the acceleration sensor is not acceleration related to a body movement of the user, the controller does not determine a movement of the terminal body based on the acceleration sensed by the acceleration sensor. That is, the controller 180 can disregard the acceleration sensed by the acceleration sensor. Thus, in the present disclosure, since a body movement of the user is not determined based on acceleration not related to a body movement of the user, the accuracy of determining a body movement of the user is enhanced.

Or, when it is determined that acceleration sensed by the acceleration sensor is not acceleration related to a body movement of the user, the controller 180 can change a movement determination algorithm. In more detail, when acceleration sensed by the acceleration sensor is generated by a body movement of the user, the controller 180 can analyze the acceleration based on a first algorithm, and determine a movement of the terminal body based on an analysis result. Here, the first algorithm may be a generally known movement determination algorithm. When the acceleration sensed by the acceleration sensor is not acceleration related to a body movement of the user, the controller 180 can determine a movement of the terminal body based on a second algorithm.

The second algorithm may be an algorithm additionally including an error correction step of the first algorithm. For example, the second algorithm is an algorithm in which a noise filter of a signal generated by the vehicle is added. Thus, when it is recognized that the user gets in the vehicle, acceleration generated by the vehicle may be canceled out and a movement of the terminal body can be determined using only acceleration based on a body movement of the user. Thus, in the present disclosure, the accuracy may be enhanced in determining a body movement of the user by using acceleration sensed in the mobile terminal.

Hereinafter, a method for generating action information through the low-energy image sensor 200 will be described with reference to the accompanying drawings. In particular, FIGS. 7A and 7B are conceptual views illustrating an embodiment related to a method for generating action information.

As described above, the controller 180 can analyze an image captured by the low-energy image sensor 200 to generate situation information. The situation information may include action information related to an action of the user. For example, the action information may include information indicating an action that the user is walking with the terminal held in his hand, information indicating an action that the user hits, taps, or touches a portion of the terminal body, and the like.

Figure 7A:
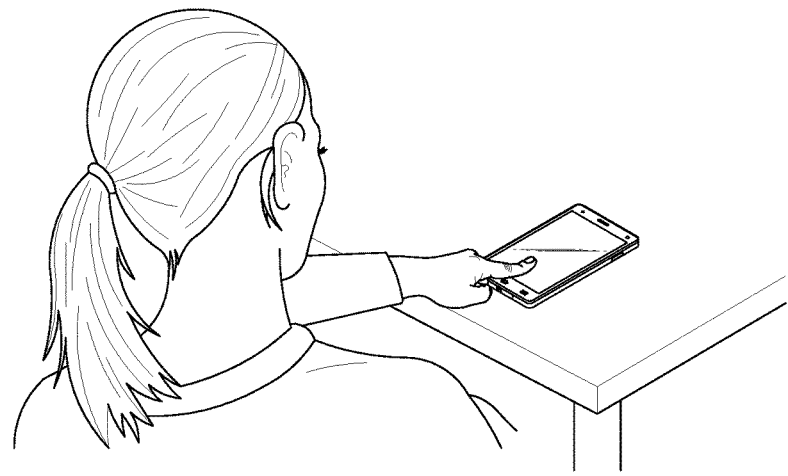
FIGS. 7A and 7B are conceptual views illustrating an embodiment related to a method for generating action information.
Figure 7A:
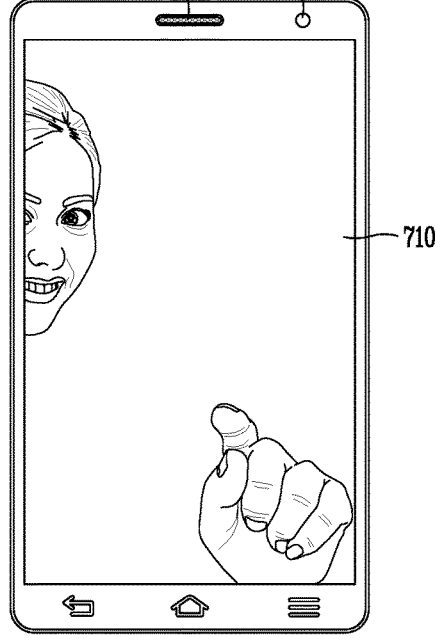
Figure 7A:
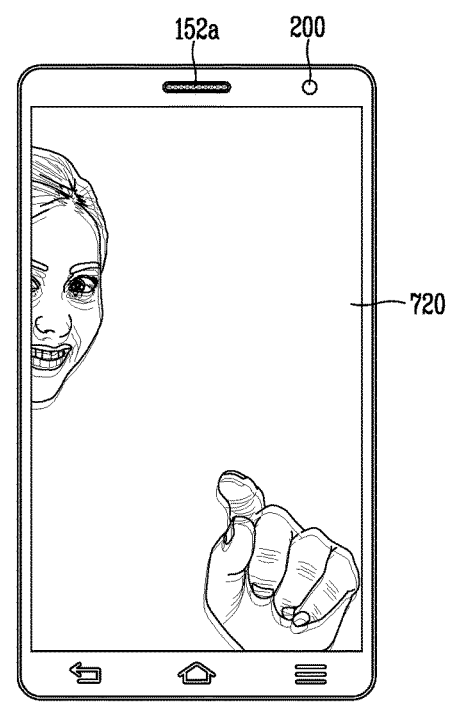
Figure 7B:
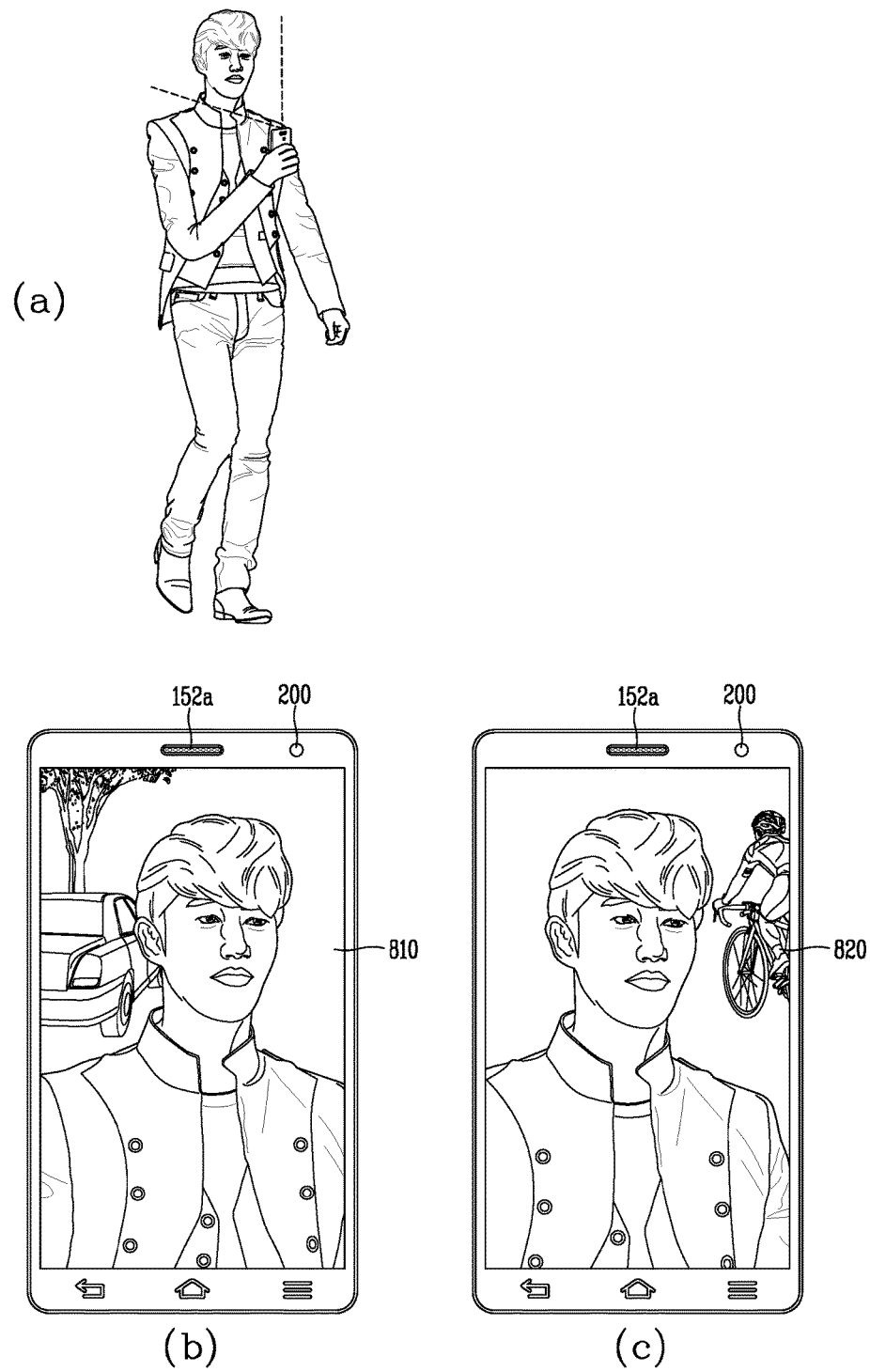

For example, as illustrated in (a) of FIG. 7A, when the terminal is placed on a desk, the user can touch a front surface of the terminal with his hand. Here, the terminal body vibrates due to the user's touch and the acceleration sensor can sense the acceleration based on the vibration of the terminal body.

When acceleration is sensed by the acceleration sensor, the controller 180 can analyze an image captured through the low-energy image sensor 200 in order to determine whether the acceleration is based on a body movement of the user. Also, the controller 180 can generate situation information based on a result of analyzing the image. For example, as illustrated in (b) and (c) of FIG. 7A, the controller 180 can analyze two images 710 and 720 that the user touches the terminal with his hand.

In order to determine whether a touch is applied while the terminal body is moving or whether a touch is applied without movement of the terminal body, the controller 180 can determine similarity between the two images 710 and 720. The similarity may be detected by a pixel variation between the two images. The similarly may be in inverse proportion to the pixel variation. That is, when the pixel variation is significant, the controller 180 can measure similarity to be low, and when the pixel variation is small, the controller 180 can measure similarity to be high.

When similarity between the two images is equal to or greater than a reference value, the controller 180 can determine that a touch is applied without movement of the terminal body. Thus, the controller 180 can generate action information indicating that a touch input is applied when the user does not move the terminal body.

Based on the generated action information, the controller 180 can determine that acceleration sensed by the acceleration sensor is acceleration not related to a body movement of the user. Also, the controller 180 can not determine a movement of the terminal body in accordance with the acceleration sensed by the acceleration sensor.

In another example, as illustrated in (a) of FIG. 7B, the user can walk with the terminal held in his hand. Here, since the terminal body 100 rarely moves, the acceleration sensor can sense a very small acceleration.

When acceleration is sensed by the acceleration sensor, the controller 180 can analyze an image captured through the low-energy image sensor 200 in order to determine whether the acceleration is based on a body movement of the user. Also, the controller 180 can generate situation information based on an analysis result of the image. For example, as illustrated in (b) and (c) of FIG. 7B, the controller 180 can analyze two images 810 and 820 indicating that the user is walking.

Based on a result of analyzing the two images 810 and 820, the controller 180 can determine that there is a body movement of the user. Thus, the controller 180 can generate action information indicating that the user is walking. Here, the controller 180 can determine that very small acceleration sensed by the acceleration sensor is acceleration related to a body movement, and determine the body movement based on the very small acceleration. Thus, in the present disclosure, a problem that the acceleration sensor does not sense a body movement of the user when there is a body movement of the user but the terminal rarely moves is solved.

Hereinafter, a method for determining a posture of the terminal body through the acceleration sensor in a state in which the user is placed in a vehicle will be described. In particular, FIG. 8A is a conceptual view illustrating a posture of a terminal body, FIG. 8B is a conceptual view illustrating an embodiment related to a method for displaying information based on the posture of the mobile terminal, and FIGS. 9A to 10C are views illustrating a method for determining a posture of a terminal body through an acceleration sensor in a state in which a user is placed in a vehicle.

The controller 180 of the mobile terminal according to the present disclosure can determine a posture of the terminal body based on acceleration sensed by the acceleration sensor. Based on a virtual reference line, a posture of the terminal body includes a first posture in which a length direction of the terminal body is parallel to the virtual reference line and a second posture in which the length direction of the terminal body is perpendicular to the virtual reference line.

Figure 8A:
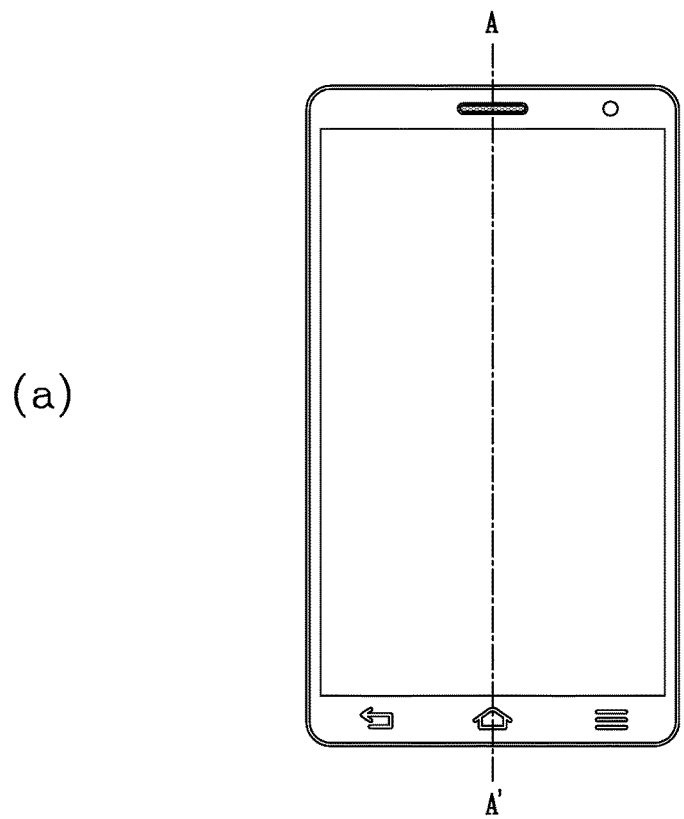
FIG. 8A is a conceptual view illustrating a posture of a terminal body.
Figure 8A:
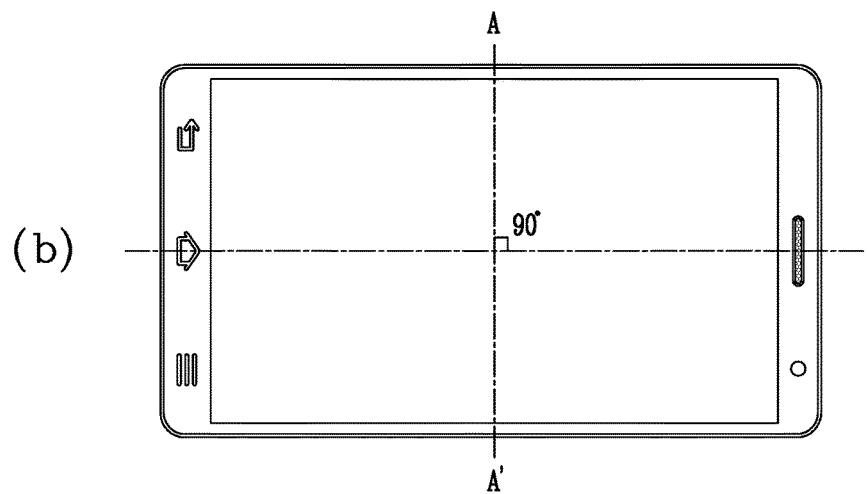
Figure 8B:
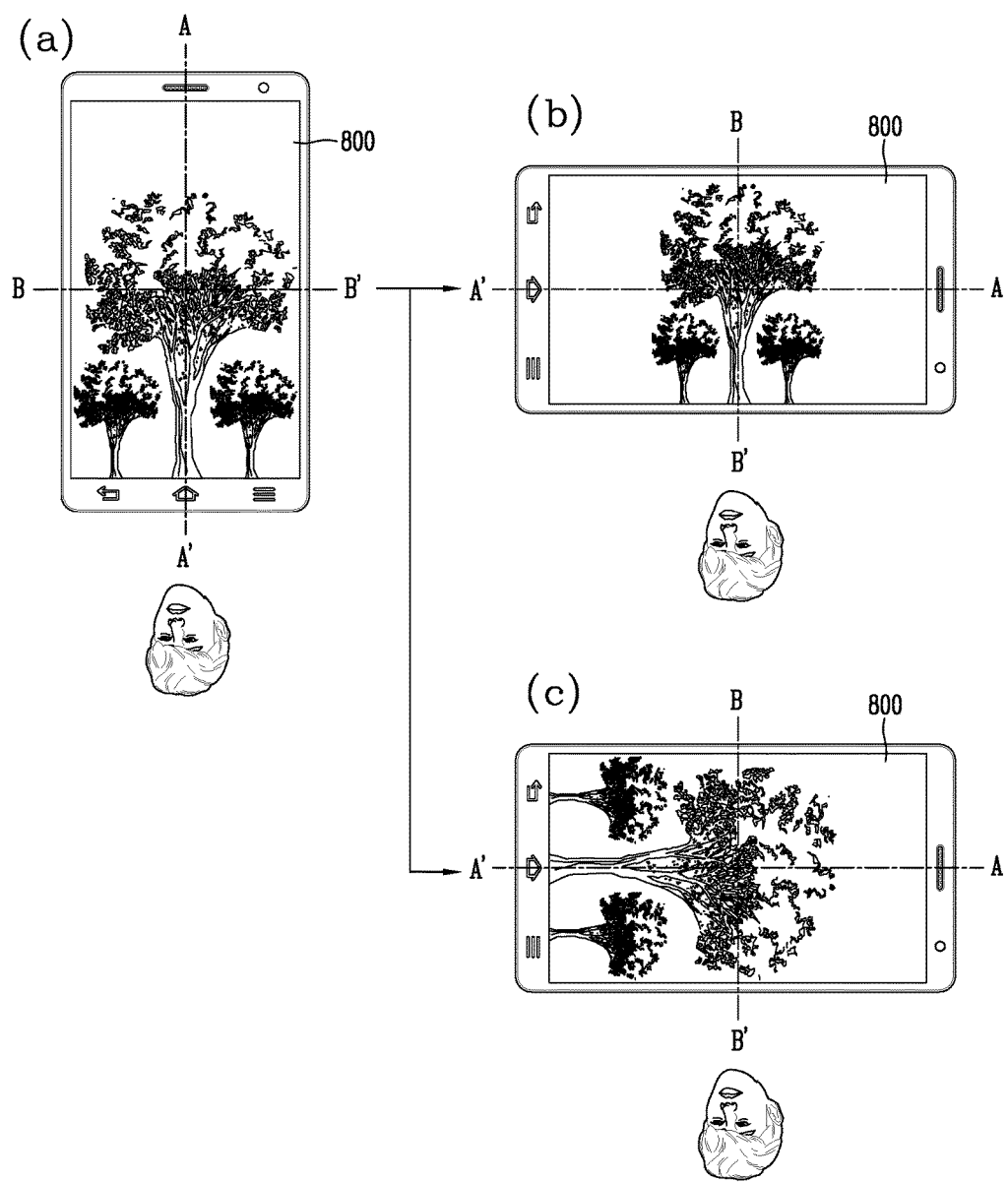
FIG. 8B is a conceptual view illustrating an embodiment related to a method for displaying information based on the posture of the mobile terminal.

For example, as illustrated in (a) of FIG. 8A, the first posture is a posture in which the length direction of the terminal body is parallel to the virtual reference line A-A' in a gravitation direction. This posture may also be termed a vertical posture in which the terminal body is vertically erected. Also, as illustrated in (b) of FIG. 8A, the second posture is a posture in which the length direction of the terminal body is perpendicular to the virtual reference line A-A'. This posture may be termed a horizontal posture in which the terminal body is horizontally laid.

The controller 180 can determine a display direction of visual information displayed on the display unit 151. The display direction of the visual information is a direction in which visual information is displayed on the display unit 151.

A display direction in which visual information is displayed in a vertical direction of the terminal body with respect to a posture of the terminal body may be defined as a first direction, and a display direction in which visual information is displayed in a horizontal direction of the terminal body may be defined as a second direction. For example, a direction in which visual information 800 of (a) of FIG. 8B is displayed may be defined as the first direction (A-A') and a direction in which the visual information 800 of (b) of FIG. 8B is displayed may be defined as the second direction (B-B').

The controller 180 can change a display direction of visual information according to a posture of the terminal body. For example, as illustrated in (a) and (b) of FIG. 8B, when the terminal body is changed from the first posture to the second posture, the controller 180 can change the visual information 800 from the first direction (A-A') to the second direction (B-B') to display the visual information 800.

Also, although a posture of the terminal body is changed, the controller 180 can not change a display direction of visual information. For example, as illustrated in (a) and (c) of FIG. 8B, although the terminal body is changed from the first posture to the second posture, the controller 180 can constantly display the visual information 800 in the first direction (A-A'). The user can directly set whether to change a display direction of visual information according to a posture of the terminal body.

In the following descriptions, it is assumed that a display direction of visual information is set to be changed according to a posture of the terminal body. Further, as described above, when it is determined that the user is placed within a vehicle through the low-energy image sensor 200, the controller 180 can determine that acceleration sensed by the acceleration sensor is not acceleration related to a body movement of the user. Here, the controller 180 can disregard the acceleration sensed by the acceleration sensor.

Here, since the controller 180 disregards the acceleration sensed by the acceleration sensor, the controller 180 can not determine a posture of the terminal body. Thus, the controller 180 does not change a display direction of visual information according to a posture of the terminal body.

In order to prevent this problem, when the user is placed within the vehicle, the controller 180 can determine a posture of the terminal body through an image captured by the low-energy image sensor 200.

Figure 9A:
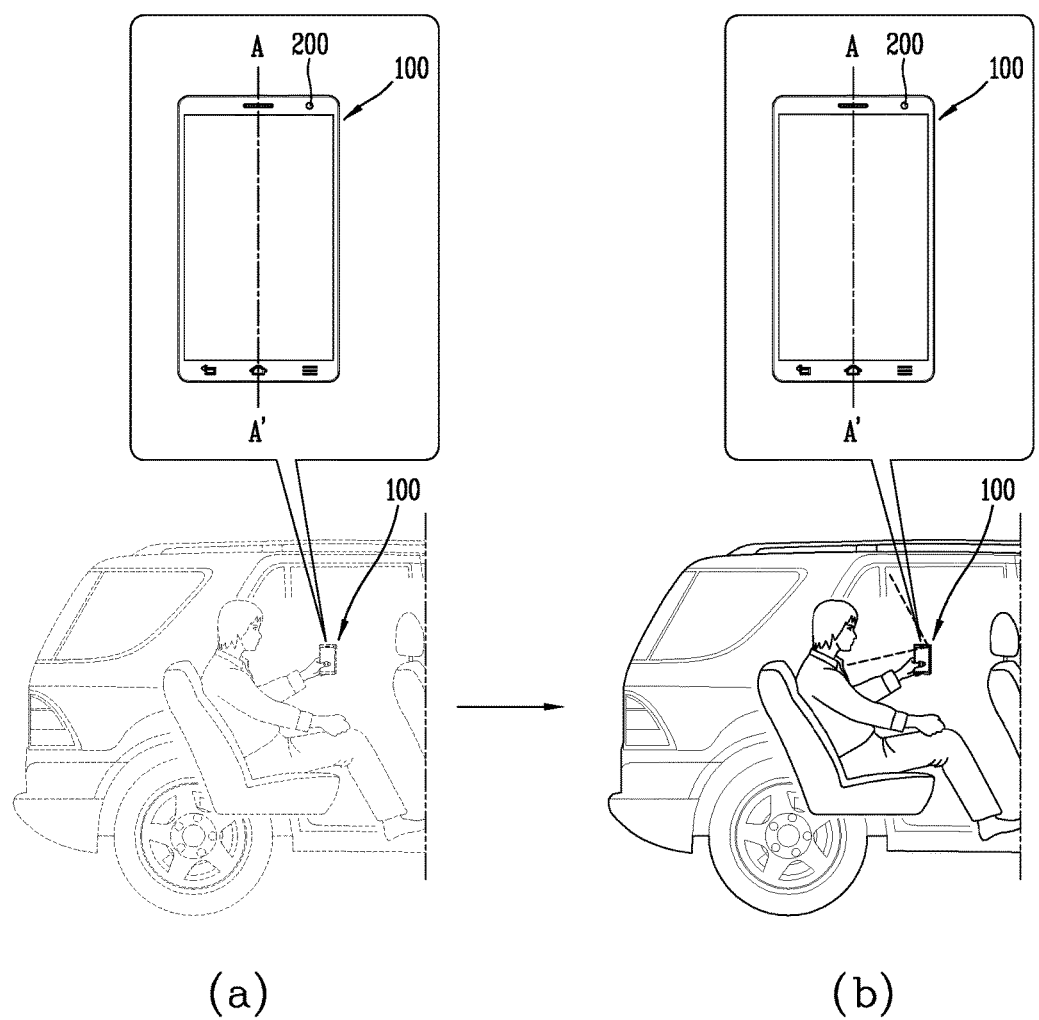
FIGS. 9A to 10C are views illustrating a method for determining a posture of a terminal body through an acceleration sensor in a state in which a user is placed in a vehicle.
Figure 9B:
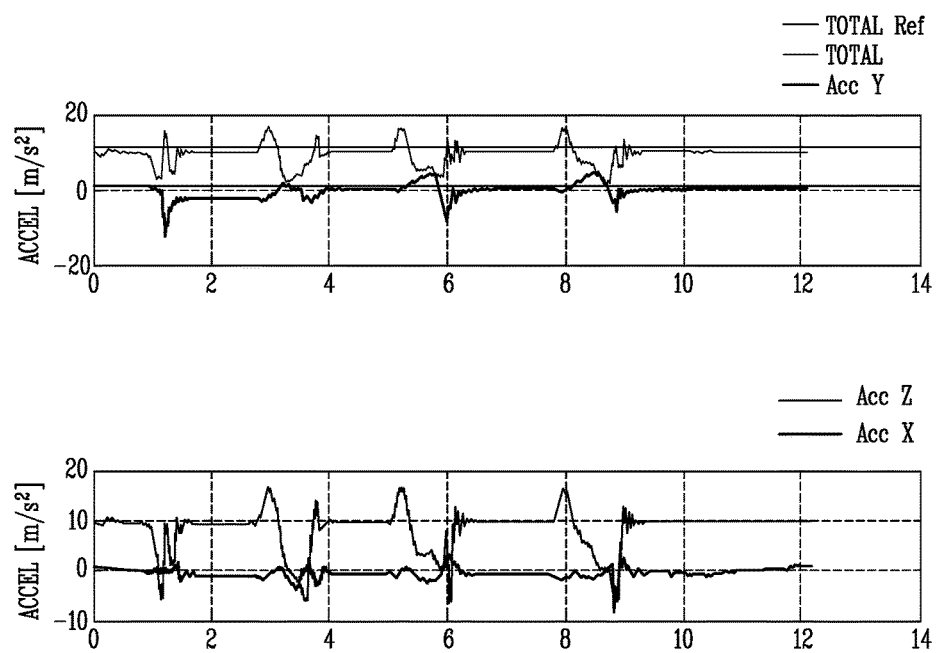

In more detail, when the user placed within a vehicle does not move the main body of the mobile terminal as illustrated in (a) and (b) of FIG. 9A, the acceleration sensor can sense the acceleration generated according to driving of the vehicle as illustrated in FIG. 9B. Also, when the user placed within the vehicle moves the terminal body as illustrated in (a) and (b) of FIG. 10A, the acceleration sensor can sense the acceleration generated according to driving of the vehicle and movement of the mobile terminal as illustrated in FIG. 10B.

Figure 10A:
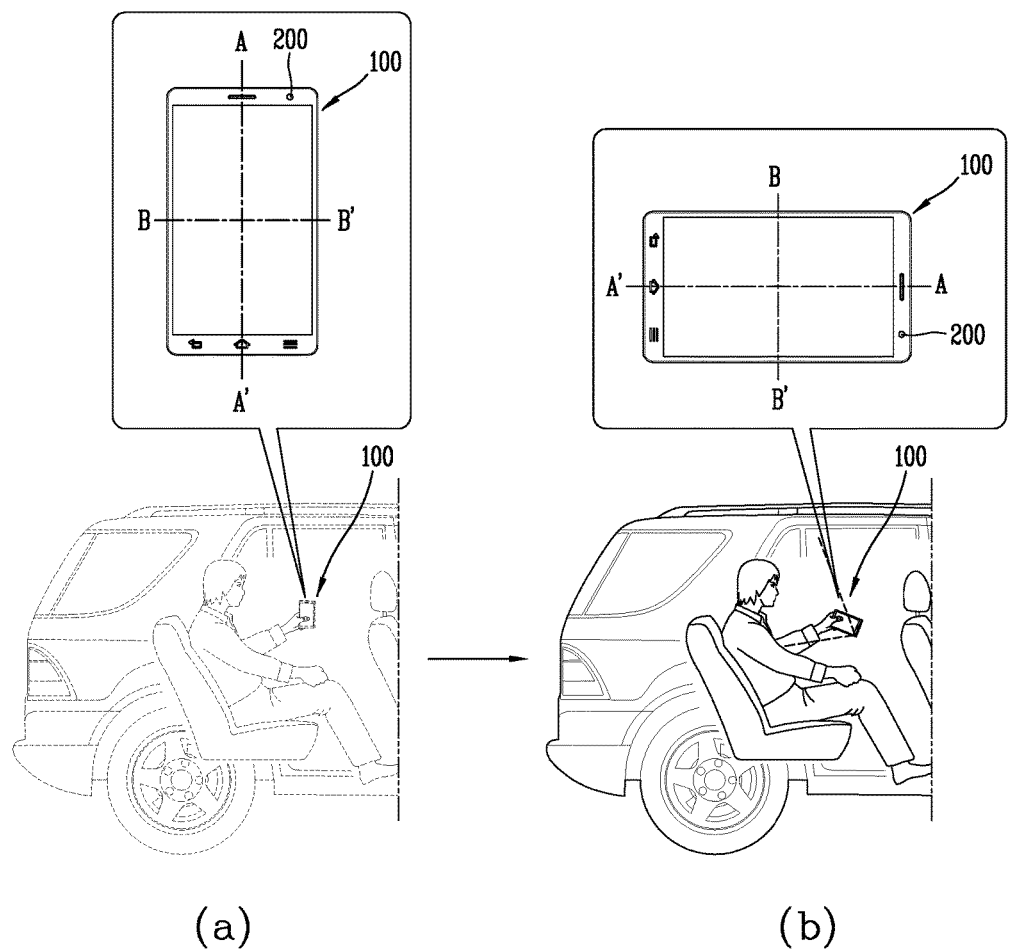
Figure 10B:
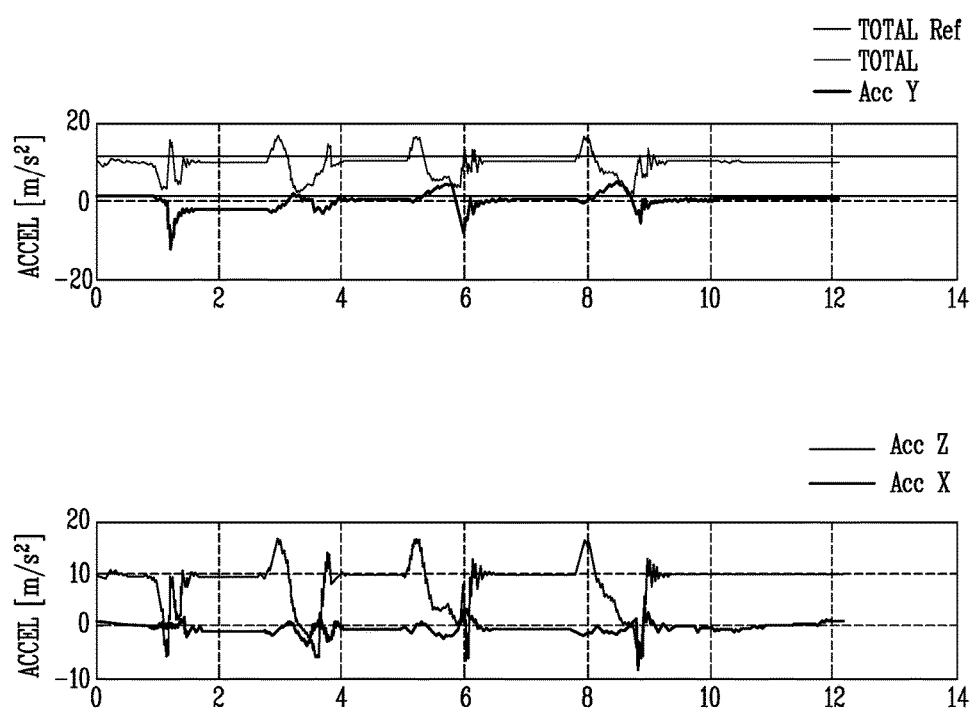

Here, acceleration generated according to movement of the mobile terminal has as very small value, relative to the acceleration generated according to driving of the vehicle, and thus, the accelerations may have the substantially same value in the acceleration sensor as illustrated in FIGS. 9B and 10B.

Figure 9C:
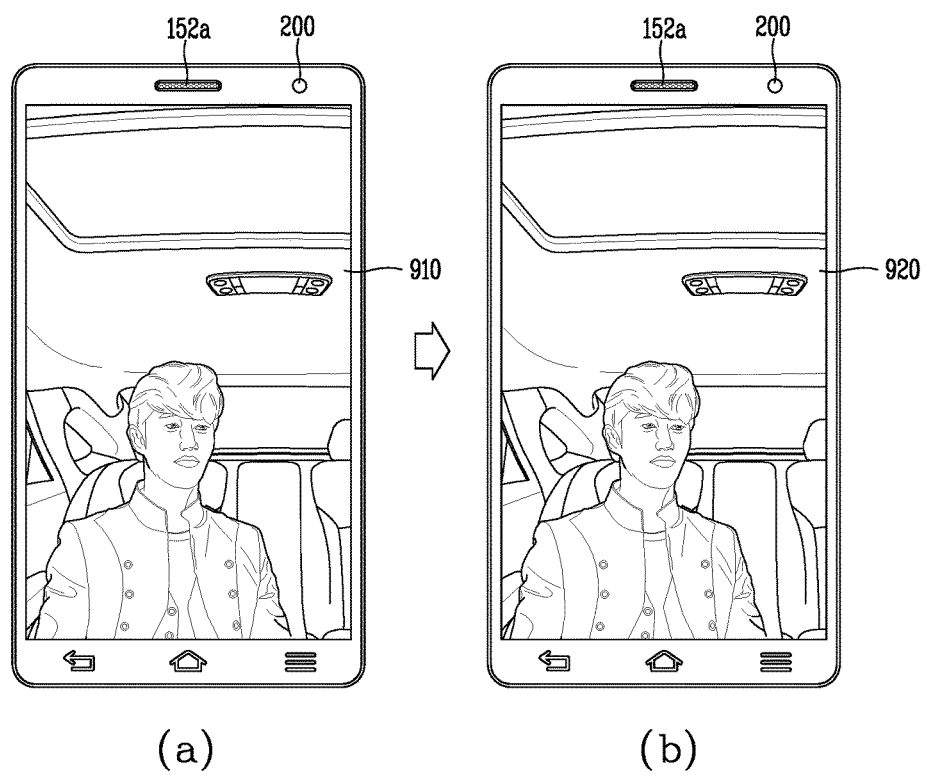

As illustrated in FIG. 9C, the controller 180 can compare two images captured from the inside of the vehicle through the low-energy image sensor 200. The two images may be images captured before and after a timing at which it is determined that the terminal body has moved.

The controller 180 can determine whether the terminal has moved based on a pixel variation between at least two images captured by the low-energy image sensor 200. In more detail, when a pixel variation between the at least two images is equal to or greater than a reference value, the controller 180 can determine that similarity between the at least two images is low.

Also, when similarity between the at least two images is low, the controller 180 can determine that the terminal body has moved. Conversely, when the pixel variation between the at least two images is smaller than the reference value, the controller 180 can determine that the at least two images have high similarity. When similarity between the at least two images is high, the controller 180 can determine that the terminal body has not moved.

For example, the controller 180 can analyze pixels of the two images. When a pixel variation between the two images is equal to or higher than the reference value, the controller 180 can determine that the terminal body has moved. Or, when the pixel variation between the two images is smaller than the reference value, the controller 180 can determine that the main body has not moved. The reference value may be a preset constant.

For example, as illustrated in (a) and (b) of FIG. 9C, when a pixel variation between two images 910 and 920 captured at different timings is smaller than the reference value, the controller 180 can determine that the terminal body has not moved.

Figure 10C:
Figure 10C:

However, as illustrated in (a) and (b) of FIG. 10C, when a pixel variation between two images 1010 and 1020 captured at different timings is equal to or greater than the reference value, the controller 180 can determine that the terminal body has moved. Here, the controller 180 can recognize a relative movement of the terminal body by comparing the two images 1010 and 1020. For example, as illustrated in (a) and (b) of FIG. 10C, when graphic objects corresponding to the persons respectively included in the two images are perpendicular to each other, the controller 180 can determine that a posture before the terminal body moves and a posture after the terminal body moves are perpendicular to each other. That is, the controller 180 can determine that the terminal body was changed from the first posture to the second posture.

Here, the controller 180 can change a display direction of visual information based on the posture of the terminal body. Thus, even in a state in which the user is placed within the vehicle, the controller 180 can determine a posture of the terminal body through the low-energy image sensor 200.

So far, the method for determining a posture of the terminal body through the low-energy image sensor has been described. Thus, in the present disclosure, even in a situation in which a movement of the terminal body cannot be properly determined due to acceleration of a vehicle, a movement of the terminal body may be accurately determined through the low-energy image sensor.

Figure 11A:
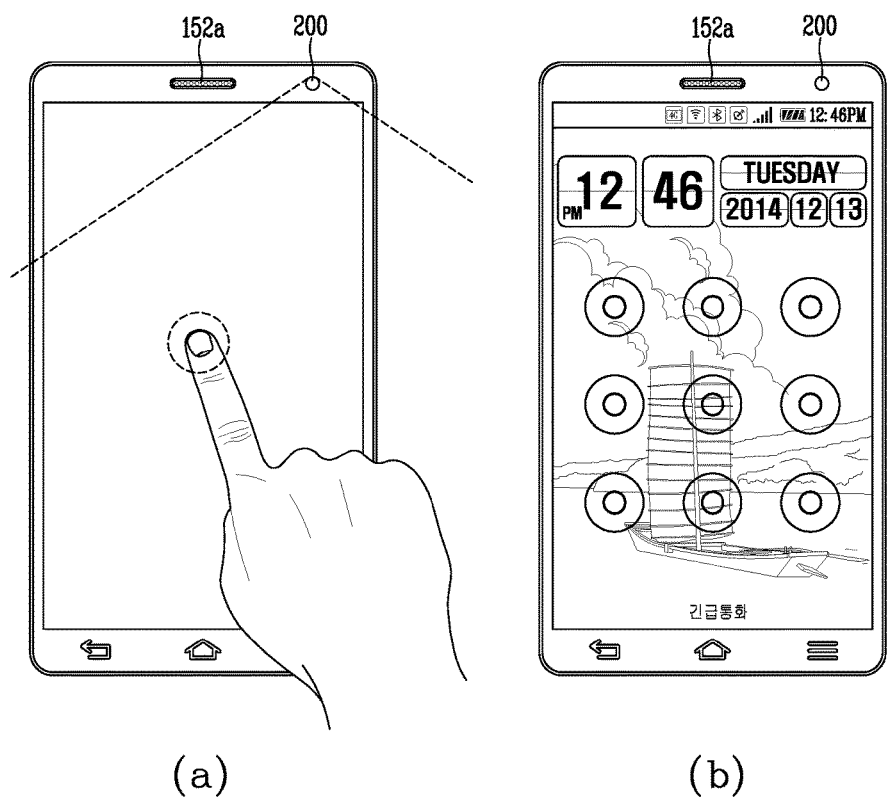
FIGS. 11A and 11B are views illustrating a method for sensing a knock-on input in a mobile terminal in accordance with the present disclosure.
Figure 11B:
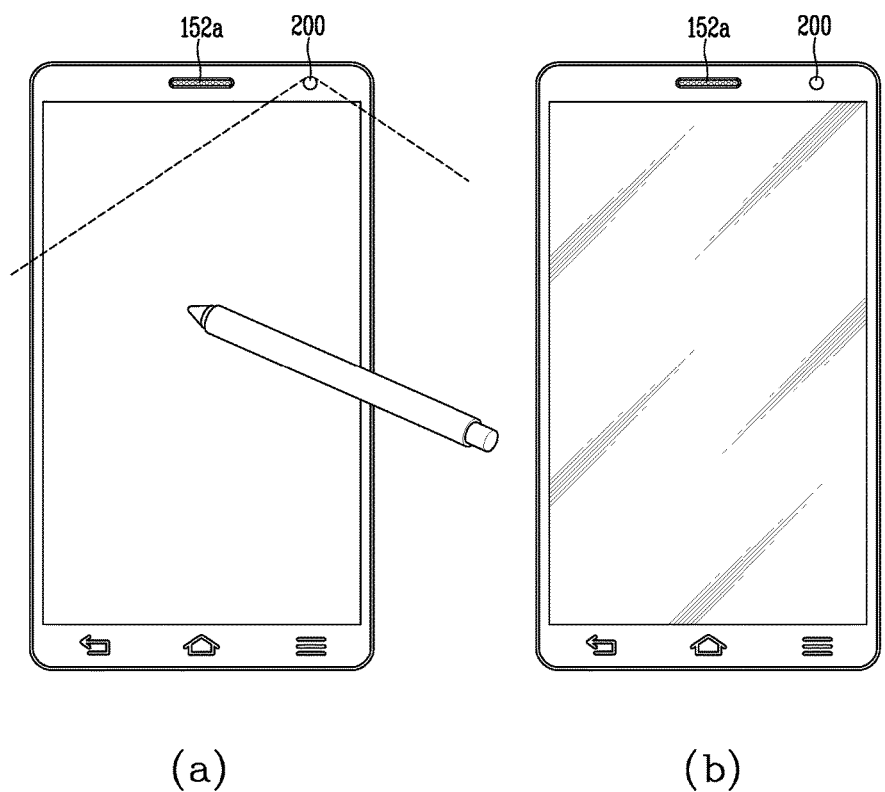

Hereinafter, a method for sensing a knock-on input through the acceleration sensor and the low-energy image sensor will be described. In particular, FIGS. 11A and 11B are views illustrating a method for sensing a knock-on input in a mobile terminal in accordance with the present disclosure. The knock-on input refers to an input of tapping or hitting the terminal body of the mobile terminal. For example, as illustrated in FIG. 11A, the knock-on input is an input tapping a region of the display unit 151 when the display unit 151 is turned off. In addition, the knock-on input also includes an input of tapping the display unit 151 or tapping a region of the terminal body when the display unit 151 is turned on.

The knock-on input may be inputs applied twice continuously within a predetermined period of time. When the knock-on input is applied to the turned-off or deactivated display unit 151, the controller 180 can turn on the display unit. For example, as illustrated in (a) and (b) of FIG. 11A, the controller 180 can turn on the display unit 151 in response to a knock-on input.

Further, the knock-on input can also be sensed by the acceleration sensor. That is, the controller 180 can check whether a knock-on input is received based on acceleration generated in the terminal body. However, the controller 180 may not be able to distinguish a subject applying the knock-on input only by the acceleration sensed by the acceleration sensor. This leads to a problem that the controller 180 determines an input applied as an object other than a user's hand taps on the mobile terminal, as a knock-on input.

When the knock-on input is sensed, the controller 180 can recognize a subject applying the knock-on input using an image captured at the time of sensing the knock-on input through the low-energy image sensor 200. For example, as illustrated in (a) of FIG. 11A, the controller 180 can capture an image including a finger tapping on the display unit 151 through the low-energy image sensor 200. In this instance, as illustrated in (b) of FIG. 11A, the controller 180 can determine that the input is a knock-on input and turn on the display unit 151. When the display unit 151 is turned on, the controller 180 can display a locked screen on the display unit 151.

In another example, as illustrated in (a) of FIG. 11B, the controller 180 can capture an image including a pen tapping on the display unit 151 through the low-energy image sensor 200. Here, the controller 180 can determine that the input is not a knock-on input. Thus, as illustrated in (b) of FIG. 11B, the controller 180 can not turn on the display unit 151.

In addition, the controller 180 can also determine the knock-on input using the image including the finger tapping on the terminal body through the low-energy image sensor 200. In more detail, the user can apply a knock-on input to the terminal, while running. Here, the acceleration sensor can sense both acceleration due to the user's movement of running and acceleration due to the knock-on input.

The controller 180 can not distinguish between the acceleration due to the knock-on input and the acceleration due to the user's movement of running, sensed by the acceleration sensor. Thus, the controller 180 can determine whether the knock-on input is received based on an image captured by the low-energy image sensor 200. In more detail, when the image including a finger tapping on the terminal body is sensed, the controller 180 can determine that a knock-on input has been applied, and when an image including a finger tapping on the terminal body is not sensed, the controller 180 can determine that a knock-input has not been applied. Thus, the controller 180 can enhance accuracy of sensing of the knock-on input.

Figure 12:
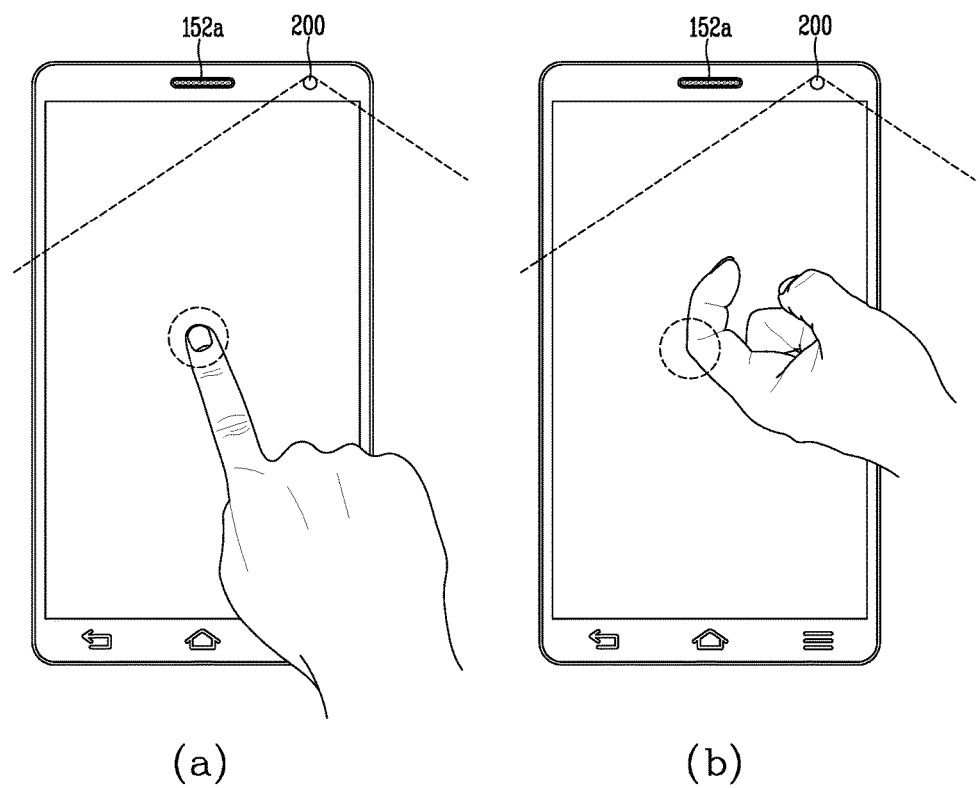
FIG. 12 is a view illustrating an embodiment in which a touch object of a touch input is distinguished in a mobile terminal in accordance with the present disclosure.

So far, the method for sensing a knock-on input in the mobile terminal according to the present disclosure has been described. Hereinafter, a method for distinguishing a touch object of a touch input in a mobile terminal according to the present disclosure will be described. In particular, FIG. 12 is a view illustrating an embodiment in which a touch object of a touch input is distinguished in a mobile terminal in accordance with the present disclosure.

The user can apply a touch input to the mobile terminal using part of his body. For example, the user can apply a touch input to the mobile terminal by a fingertip, a knuckle, a palm, a fist, a nail, and the like. Also, the user can apply a touch input using an object, for example, a pen, rather than by a body part.

The controller 180 can distinguish a touch object based on a touch area and acceleration generated due to the touch input. However, this distinguishing method has low accuracy to cause malfunction. Thus, the mobile terminal according to the present disclosure can distinguish a touch object of a touch input using an image captured through the low-energy image sensor 200. Here, the touch object is an object applying a touch input and includes a fingertip, a knuckle, a palm, a fist, a nail, a pen, and the like, as mentioned above.

For example, when an acceleration is sensed by the acceleration sensor, the controller 180 can analyze an image captured by the low-energy image sensor 200. Here, as illustrated in (a) of FIG. 12, when the captured image is an image of applying a touch input by a fingertip, the controller 180 can determine that the touch input is a touch input applied by a fingertip. In another example, as illustrated in (b) of FIG. 12, when the captured image is an input of applying a touch input by a knuckle, the controller 180 can determine that the touch input is a touch input applied by a knuckle.

Thus, the controller 180 can perform different controlling based on a touch object. For example, when a touch input is applied when visual information is displayed on the display unit 151, the controller 180 can execute a function related to the visual information. Also, when the user applies touch inputs by the knuckle twice when visual information is displayed on the display unit 151, the controller 180 can execute a screen capture function.

The screen capture function is a function of storing visual information currently displayed on the display unit 151, as an image. In addition, the controller 180 can distinguish between various touch objects through image analysis. Thus, in the present disclosure, a touch object can be more accurately distinguished.

As described above, in the mobile terminal according to the present disclosure, when an acceleration of the terminal body is sensed through the acceleration sensor, a surrounding image at the time of sensing the acceleration is captured through the low-energy image sensor and whether the acceleration is based on a body movement of the user can be determined based on the captured surrounding image. Thus, in the present disclosure, the accuracy of determining a body movement of the user can be enhanced.

Also, in the present disclosure, whether the user is placed within a vehicle is determined based on a surrounding image captured by the low-energy image sensor, and when the user is placed within the vehicle, a movement of the terminal body is not determined based on an acceleration sensed by the acceleration sensor, whereby accuracy of determining a movement of the terminal body may be enhanced.

Also, when it is detected that the user is placed within the vehicle, a movement of the terminal body is determined based on a surrounding image captured by the low-energy image sensor, whereby the movement of the terminal body which may not be detected by the acceleration sensor can be detected. Thus, in the present disclosure, even when the user is placed within the vehicle, various operations in accordance with a movement of the terminal body may be performed. Also, in the present disclosure, a touch object (e.g., a fingertip or a knuckle) applying a touch input can be detected through the low-energy image sensor. Thus, in the present disclosure, a touch object can be more accurately determined.

The present invention described above may be implemented as a computer-readable code in a medium in which a program is recorded. The computer-readable medium includes any type of recording device in which data that can be read by a computer system is stored. The computer-readable medium may be, for example, a hard disk drive (HDD), a solid state disk (SSD), a silicon disk drive (SDD), a ROM, a RAM, a CD-ROM, a magnetic tape, a floppy disk, an optical data storage device, and the like. The computer-readable medium also includes implementations in the form of carrier waves (e.g., transmission via the Internet). Also, the computer may include the controller 180 of the terminal. Thus, the foregoing detailed description should not be interpreted limitedly in every aspect and should be considered to be illustrative. The scope of the present invention should be determined by reasonable interpretations of the attached claims and every modification within the equivalent range are included in the scope of the present invention.

The foregoing embodiments and advantages are merely exemplary and are not to be considered as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds are therefore intended to be embraced by the appended claims.

What is claimed is:

1. A mobile terminal comprising:
    a wireless communication unit configured to provide wireless communication;
    a display;
    an acceleration sensor;
    a low-energy image sensor; and
    a controller configured to:
    control the acceleration sensor to sense an acceleration of the mobile terminal,
    control the low-energy sensor to capture a surrounding image of the mobile terminal at a time the acceleration of the mobile terminal is sensed,
    in response to the sensed acceleration of the mobile terminal, determine whether the sensed acceleration is related to a body movement of a user carrying the mobile terminal based on the surrounding image, generate situation information on the display indicating a surrounding situation of the mobile terminal by analyzing the surrounding image based on an image analysis algorithm, and
    in response to the generated situation information, determine a movement of the mobile terminal is different than the body movement of the user based on the surrounding image, and disregard the sensed acceleration.

2. The mobile terminal of claim 1, wherein the situation information includes at least one of occupancy information indicating whether the user is inside a vehicle, type information of the vehicle, and object information related to an object present in a vicinity of the mobile terminal.

3. The mobile terminal of claim 2, wherein
    when the user is determined to be inside the vehicle, the controller is further configured to determine that the sensed acceleration of the mobile terminal is related to the movement different than the body movement of the user, and
    when the user is determined not to be inside the vehicle, the controller is further configured to determine that the sensed acceleration of the mobile terminal is related to the body movement of the user carrying the mobile terminal.

4. The mobile terminal of claim 2, wherein the vehicle includes at least one of a driving vehicle, a flying object, and a floating object that floats on the sea.

5. The mobile terminal of claim 4, further comprising:
    when the sensed acceleration of the mobile terminal is determined to be related to the movement different than the body movement of the user, the controller is further configured to determine a movement of the mobile terminal based on the surrounding image and determine a display direction of visual information based on the movement of the mobile terminal.

6. The mobile terminal of claim 5, wherein the controller is further configured to compare at least two images captured at a time when the acceleration is sensed, and determine the movement of the mobile terminal based on a comparison result.

7. The mobile terminal of claim 6, wherein
    when a pixel variation between the at least two images captured by the low-energy image sensor is equal to or greater than a preset level, the controller is further configured to determine that the mobile terminal has moved, and
    when the pixel variation between the at least two images captured by the low-energy image sensor is smaller than the preset level, the controller is further configured to determine that the mobile terminal has not moved.

8. The mobile terminal of claim 5, wherein
    when the movement of the mobile terminal is from a first posture to a second posture, the controller is further configured to change a display direction of the visual information from a first display direction to a second display direction, and
    when the movement of the mobile terminal is from the second posture to the first posture, the controller is further configured to change the display direction of the visual information from the second display direction to the first display direction.

9. The mobile terminal of claim 4, wherein the controller is further configured to:
deactivate the display, and
activate the display when the acceleration senses a tap input applied to the deactivated display.

10. The mobile terminal of claim 9, wherein the controller is further configured to:
when the tap input is sensed, detect whether the user's hand is included in the surrounding image, and
when the user's hand is included in the surrounding image, activate the deactivated display in response to the tap input.

11. The mobile terminal of claim 9, wherein when the tap input is sensed, the controller is further configured to detect the user's hand from the surrounding image, and determine a shape of the user's hand applying the tap input.

12. The mobile terminal of claim 11, wherein the controller is further configured to activate the deactivated display based on the tap input, and perform different operations based on a shape of a finger of the user's hand applying the tap input.

13. The mobile terminal of claim 11, wherein the controller is further configured to determine whether the tap input is applied by a fingertip or a knuckle of the user's hand based on a shape of the user's hand.

14. A method of controlling a mobile terminal, the mobile terminal comprising:
sensing, via an acceleration sensor, an acceleration of the mobile terminal;
capturing, via a low-energy sensor, a surrounding image of the mobile terminal at a time the acceleration of the mobile terminal is sensed; in response to the sensed acceleration of the mobile terminal, determining, via a controller, whether the sensed acceleration is related to a body movement of a user carrying the mobile terminal based on the surrounding image;
generating situation information on a display of the mobile terminal indicating a surrounding situation of the mobile terminal by analyzing the surrounding image based on an image analysis algorithm; and
in response to the generated situation information, determining a movement of the mobile terminal is different than the body movement of the user based on the surrounding image, and disregarding, via the controller, the sensed acceleration.

15. The method of claim 14, wherein the situation information includes at least one of occupancy information indicating whether the user is inside a vehicle, type information of the vehicle, and object information related to an object present in a vicinity of the mobile terminal.

16. The method of claim 15, further comprising:
when the user is determined to be inside the vehicle, determining that the sensed acceleration of the mobile terminal is related to the movement different than the body movement of the user; and
when the user is determined not to be inside the vehicle, determining that the sensed acceleration of the mobile terminal is related to the body movement of the user carrying the mobile terminal.

17. The method of claim 15, wherein the vehicle includes at least one of a driving vehicle, a flying object, and a floating object that floats on the sea.

18. The method of claim 14, further comprising:
when the sensed acceleration of the mobile terminal is determined to be related to the movement different than the body movement of the user, determining a movement of the mobile terminal based on the surrounding image and determine a display direction of visual information based on the movement of the mobile terminal.

* * * * *